(12) United States Patent
Crist

(10) Patent No.: US 6,297,208 B1
(45) Date of Patent: Oct. 2, 2001

(54) RUST STAIN REMOVAL FORMULA

(75) Inventor: Robert F. Crist, Bargersville, IN (US)

(73) Assignee: Iron Out, Inc., Fort Wayne, IN (US)

( * ) Notice: Subject to any disclaimer, the term of this patent is extended or adjusted under 35 U.S.C. 154(b) by 0 days.

(21) Appl. No.: 09/416,170

(22) Filed: Oct. 11, 1999

(51) Int. Cl.$^7$ ................ C11D 7/08; C11D 7/26; C11D 3/60; C23G 1/02
(52) U.S. Cl. .......... 510/363; 510/434; 510/477; 510/488; 134/3; 134/41
(58) Field of Search ................ 510/363, 477, 510/434, 488; 134/3, 41

(56) References Cited

U.S. PATENT DOCUMENTS

| | | |
|---|---|---|
| 1,574,406 | 2/1926 | Nelson . |
| 2,714,094 | 7/1955 | McNally . |
| 3,166,444 | 1/1965 | Ehren et al. . |
| 3,290,174 | 12/1966 | Kendall et al. . |
| 3,579,456 * | 5/1971 | Cambre ................... 252/137 |
| 3,793,221 | 2/1974 | Otrhalek et al. . |
| 3,907,612 * | 9/1975 | Atkiss et al. ............ 148/18 |
| 4,032,466 | 6/1977 | Otrhalek et al. . |
| 4,082,683 | 4/1978 | Galesloot . |
| 4,169,026 * | 9/1979 | Kikuchi et al. ............ 204/129.65 |
| 4,181,623 | 1/1980 | Dillarstone et al. . |
| 4,284,660 * | 8/1981 | Donaghy et al. ........ 427/560 |
| 4,502,925 * | 3/1985 | Walls ....................... 204/33 |
| 4,623,613 * | 11/1986 | Ishikawa et al. ............ 430/428 |
| 4,828,743 | 5/1989 | Rahfield et al. . |
| 4,891,150 | 1/1990 | Gross et al. . |
| 4,963,233 * | 10/1990 | Mathew ..................... 204/15 |
| 5,034,148 | 7/1991 | Black . |
| 5,215,676 | 6/1993 | Stone . |
| 5,269,957 | 12/1993 | Ikeda et al. . |
| 5,525,252 | 6/1996 | Levin et al. . |
| 5,556,833 * | 9/1996 | Howe ..................... 510/189 |
| 5,607,911 | 3/1997 | Levin et al. . |
| 5,637,252 * | 6/1997 | Johnson et al. ............ 252/79.3 |
| 5,733,377 * | 3/1998 | Howe ..................... 134/3 |
| 5,851,366 * | 12/1998 | Belscher et al. ........... 204/192.26 |
| 5,885,339 | 3/1999 | Dorsett . |
| 5,972,862 * | 10/1999 | Torii et al. ............... 510/175 |
| 5,993,686 * | 11/1999 | Streinz et al. .............. 252/79.3 |

FOREIGN PATENT DOCUMENTS

2533792 * 9/1996 (JP) .

* cited by examiner

Primary Examiner—Lorna M. Douyon
(74) Attorney, Agent, or Firm—Baker & Daniels

(57) ABSTRACT

A rust stain removal formula using fluoboric acid as the active ingredient and a method of making same. The inventive formula does not etch glazed, glass or enamel surfaces to which the formula is applied. Further, the inventive formula reduces other problems caused by the hydrofluoric acid used as the active ingredient in prior art rust stain removal formulas. The formula is initially formed by adding ammonium bifluoride, and then boric acid to a solution of heated water. Oxalic acid is then added. The ammonium bifluoride reacts with the boric acid to form fluoboric acid. Optional ingredients such as a thickener and perfume may also be included in the inventive rust stain removal formula.

21 Claims, No Drawings

RUST STAIN REMOVAL FORMULA

BACKGROUND OF THE INVENTION

The present invention relates to the removal of rust stains and more particularly, an improved formula for the removal of rust stains from toilets, sinks, chrome, clothing, and the like, which stains result from a water source having mineral or metal iron content.

Iron present in home water supplies is a common problem which can cause stains on toilets, sinks, chrome, clothing, driveways, sidewalks and the like. These "rust stains" caused by iron typically appear as an orange-brown color and can be difficult to remove. Stain causing iron in tap water can generally be traced to one of two sources.

First, the water source (e.g., a private well) may have a high mineral content of $FeCO_3$, which combines with dissolved $CO_2$ in the water to form $Fe^{2+}$ (aq). In turn, in the presence of oxygen, the $Fe^{2+}$ (aq) oxidizes to a $Fe^{3+}$ hydrate according to the following equation:

$$4Fe^{2+}(aq)+O_2(g)+4H_2O(l)+2xH_2O(l) \rightarrow 2Fe_2O_3 \cdot xH_2O(s)+8H^+(aq)$$

where $2Fe_2O_3 \cdot xH_2O(s)$ is rust, a hydrate of iron (III). The variable amount of water of hydration is represented by x.

Alternatively, solid iron (e.g., from iron based piping) can be oxidized to $Fe^{2+}$ (aq) in the presence of oxygen. In turn, the $Fe^{2+}$ (aq) can be further oxidized to a $Fe^{3+}$ hydrate according to the above equation.

The iron oxides or rust stains formed according to the above formula can have various colors, depending upon the extent of hydration. Iron oxide stains can be colored yellow, orange, brown or even black, for example.

Commercially available cleaners for rust stain removal usually include hydrofluoric acid as the active ingredient. While an effective stain remover, hydrofluoric acid undesirably produces an "etching effect." The etching effect can be observed on enamel or glazed surfaces consisting of $SiO_2$ or the like, such as tile and glass. For example, glass surfaces appear foggy and tile loses its shine, or gloss, after exposure to hydrofluoric acid. Further, while commercially available rust stain removal formulas are safe when their directions are followed, a second problem is that hydrofluoric acid can cause severe burns when contacted with human skin, even in extremely small amounts.

An iron stain removal formula which does not produce an etching effect and does not cause severe burns when contacted with the skin, yet has an efficacy the same or nearly the same as known commercially available rust stain removal formulas is desired.

SUMMARY OF THE INVENTION

The present invention provides an effective rust stain removal formula using fluoboric acid as the active ingredient and a method of making same. The inventive formula causes less etching to glazed, glass or enamel surfaces and reduces the problems caused by the hydrofluoric acid used as the active ingredient in prior art rust stain removal formulas.

In one form thereof, the present invention provides a composition for removal of iron stains. The composition is formed from about 1 to 5 percent by weight of ammonium bifluoride, about 1 to 5 percent by weight of boric acid, and about 1 to 5 percent by weight of oxalic acid. The remainder of the composition is water and, optionally, a surfactant and a thickening agent. The ammonium bifluoride and the boric acid initially present in the composition react to form fluoboric acid, the active ingredient.

In a preferred form thereof, the inventive composition further comprises about 1 to 5 percent by weight of citric acid. More preferably, the ammonium bifluoride comprises about 2.5 to 3.5 percent by weight, the boric acid comprises about 2 to 3 percent by weight and the oxalic acid comprises about 3 to 4 percent by weight. Still more preferably, the citric acid comprises about 3 percent by weight, the surfactant comprises about 0.1 to 1.0 percent by weight and the thickening agent comprises about 0.1 to 0.5 percent by weight.

One advantage of the inventive formula is that it reduces the undesirable etching effect produced by prior art formulas which utilize hydrofluoric acid as the active ingredient. While hydrofluoric acid is an effective rust stain remover, it also dissolves silicon dioxide, which is a major component of the glazed and enamel surfaces of bathroom tiles and fixtures. Indeed, hydrofluoric acid is commonly used to etch glass. Consequently, prior art formulas which include hydrofluoric acid undesirably cause bathtubs, tiles and the like to lose their gloss and luster. The present invention utilizes fluoboric acid as the active ingredient instead of hydrofluoric acid. Unlike hydrofluoric acid, fluoboric acid does not etch silicon dioxide, and pure fluoboric acid can even be stored in glass containers at room temperature. Thus, iron stain removal formulas embodying the present invention significantly reduce the problematic etching effect associated with prior art formulas.

Another advantage of the inventive formula is that it reduces the potentially harmful effects associated with the hydrofluoric acid contained in prior art formulas. While prior art formulas which include hydrofluoric acid are safe when their directions are followed, hydrofluoric acid can cause severe and penetrating burns when contacted with the human skin. Burns caused by hydrofluoric acid are typically not noticed until the day following contact when they show as painful sores on the skin. Because the present invention utilizes fluoboric acid, and not hydrofluoric acid, the potentially harmful effects caused by hydrofluoric acid are reduced.

In another form thereof, the present invention provides a method of treating rust stains. The method includes combining a predetermined amount of ammonium bifluoride with water in a container and dissolving the ammonium bifluoride. Then, a predetermined amount of boric acid is added to the container. The contents of the container are mixed, whereby the boric acid and the ammonium bifluoride react to form a formula including fluoboric acid. The formula is then applied to an article having a rust stain thereon to remove the stain.

In a preferred form, the inventive method further comprises adding predetermined amounts of oxalic acid and optionally, citric acid, after the boric acid is added. More preferably, the method includes adding predetermined amounts of detergent and perfume after the boric acid is added. Still more preferably, the container contents are heated and maintained at about 40 to 50 degrees Celsius during adding and mixing of the components. Still more preferably, the method includes the predetermined amount of ammonium bifluoride comprising about 1 to 5 percent by weight of the formula and the predetermined amount of boric acid comprising about 1 to 5 percent by weight of the formula.

An advantage of the inventive method is that the boric acid dissolves completely and does not later precipitate from solution. Thus, the reaction of boric acid and ammonium bifluoride to produce fluoboric acid is achieved.

DETAILED DESCRIPTION

Aqueous cleaning compositions embodying the present invention include, on a weight percentage basis, from about 1% to 5% ammonium bifluoride, preferably from about 2.5% to 3.5%; from about 1% to 5% boric acid, preferably from about 2% to 3%; from about 1% to 5% oxalic acid, more preferably from about 3% to 4%; from about 1% to 5% citric acid, more preferably about 3%; nonionic surfactant from about 0.1% to 1.0%, more preferably from about 0.2% to 0.5%; perfume oil from about 0.05% to 1% wt., preferably about 0.1 wt.; a thickening agent less than 0.5%, preferably about 0.1% to 0.5% wt.; the balance water.

Method of Preparation

The method of preparation described below is for a laboratory size experimental batch, as are all examples given hereinbelow. However, it is to be understood that one of ordinary skill in the art could readily adapt the teachings hereunder to a large-scale commercial production of a formula embodying the present invention.

Step 1.

To a clean, 600 ml PYREX® (or equivalent) beaker graduated to 500 ml capacity in increments of 50 ml, 200 ml of deionized water that had previously been heated to approximately 54.5° C. (130° F.) is added.

Step 2.

The beaker containing the deionized water is placed on an electric hot pad with the heat setting on low to maintain the water temperature in a range from about 42° C.–50° C. during the addition of the raw materials (components). An electric Lightnin mixer or other common benchtop mixer is positioned over the beaker and includes a 3-bladed paddle which extends into the liquid in the beaker.

Step 3.

The first ingredient to be added to the deionized water is the thickener, the desired amount of which is first weighed on an electronic balance. A commercially available thickener suitable in the practice of the present invention is hydroxymethyl cellulose, commercially available from M.F. Cachet Company under the brand name NATROSOL. While hydroxymethyl cellulose is the preferred thickener for use with the present invention, one of ordinary skill in the art would readily recognize that other thickeners could be substituted therefor. For example, it is anticipated that any thickener stable in low pH solutions would also perform satisfactorily as a thickener in the formulas of the present invention. The electric mixer is initially set to a low rpm and the thickener added slowly. When the thickener is dissolved and the solution appears clear, which takes approximately 10 minutes, the second ingredient is ready for addition. The thickener is not essential to the formula, but provides increased contact time of the formula with stained surfaces, especially vertically oriented tiles, for example. On the other hand, in formulas used exclusively for stain removal of clothing, for example, the thickener may be eliminated.

Step 4.

While maintaining the solution temperature between 42° C.–50° C., the ammonium bifluoride is added while stirring is continued. Ammonium bifluoride suitable in the practice of the present invention is commercially available from Ulrich Chemical, Inc. in technical grade flake form. While it is preferred to react ammonium bifluoride with boric acid to form fluoboric acid in the present invention, it is anticipated that one of ordinary skill in the art could start with fluoboric acid as an initial ingredient. However, such is not preferred because fluoboric acid is available in 48 to 50% solution and has been found to be uneconomical. The speed setting of the mixer is increased to compensate for the increased viscosity caused by the addition of the thickener. Stirring is continued until the solution in the beaker is clear, typically about 10 minutes.

Step 5.

The third component to be added is boric acid. Boric acid suitable with the present invention is commercially available from Ulrich Chemical, Inc. as technical grade granular form. With continued stirring and the solution temperature maintained between 42° C.–50° C., the boric acid is added slowly. After approximately 5 minutes, the boric acid should be dissolved and the solution clear. Stirring is continued for an additional 10 minutes. This is a critical point in the manufacture because the reaction between ammonium bifluoride and the boric acid produces fluoboric acid which is the active rust removal ingredient and does not etch glass or glazed tile surfaces. It is believed that the success of method of making the inventive formula can be attributed to the order in which the boric acid is added to the composition, viz., after the ammonium bifluoride. Boric acid is difficult to maintain in solution, and this mixing procedure ensures that the boric acid is totally dissolved and does not later precipitate.

Step 6.

The next addition is oxalic acid. Oxalic acid suitable with the present invention is commercially available from Ulrich Chemical, Inc. as technical grade granular oxalic acid. The oxalic acid is added slowly with continued stirring while maintaining the temperature in the range of about 42° C.–50° C. The oxalic acid dissolves in about 5 minutes. The solution is stirred an additional 5 minutes after the solution is clear.

Step 7.

The next addition is citric acid. Citric acid suitable with the present invention is commercially available from Ulrich Chemical Company as an anhydrous product. The citric acid is added slowly with continued stirring with the mixer at a midrange setting. The temperature is maintained in the range of about 42° C.–50° C. The citric acid dissolves in about 5 minutes. The solution is stirred an additional 5 minutes after the solution is clear.

Step 8.

Next, nonionic detergent and perfume oil are combined and the combination is then added to the 600 ml beaker. A suitable nonionic detergent for use with the present invention is a nonylphenol containing 9.5 moles ethylene oxide, commercially available from Van Waters Rogers, Inc., under the brand name "9N9." A suitable perfume oil for use in the practice of the present invention is commercially available from Aroma Tech Company under the brand name "Limeaway." It is to be understood that the perfume oil and nonionic surfactant are noncritical ingredients. Thus, one of ordinary skill in the art would readily recognize many commercially available substitutes for the two specific components listed herein as surfactant and perfume. Optionally, both of these ingredients could be eliminated. The perfume oil and surfactant are premixed to ensure that the perfume oil emulsifies when added to the solution. Both the nonionic detergent and perfume oil are weighed in a small beaker 50 ml in capacity. After weighing, the two ingredients are mixed together and then a small amount (20 ml) of warm (120° F.) deionized water is added and again thoroughly mixed with a glass rod. The resulting mixture is slowly added to the 600 ml beaker. The 50 ml beaker is then flushed with room temperature deionized water. The hot plate is turned off and stirring is continued for another 20 minutes.

Step 9.

The 600 ml beaker (containing all ingredients) is placed on an electronic balance and brought to the proper weight by adding room temperature deionized water. The final mixture is then stirred an additional 20 minutes to ensure complete mixing of all ingredients.

Function of Ingredients

Without wishing to be tied to any specific theory of operation, it is believed that the ingredients in the inventive formula perform the following functions. The thickener increases the viscosity of the formula and therefore allows the formula to remain on stained surfaces, especially sloped or vertical surfaces where contact time would otherwise be difficult. Ammonium Bifluoride provides a source of fluoride in the invention composition. Boric Acid provides a source of boron in the current invention. The reaction of ammonium bifluoride and boric acid produces fluoboric acid, the active ingredient in the inventive formula. Fluoboric does not etch glass, enamel or glazed surfaces like prior art formulations which utilize hydrofluoric acid as the active ingredient. Oxalic Acid provides a low pH to the formula which aids in rust removal. Citric Acid also provides a low pH in the formula. While it is preferred to include citric acid in the inventive formula, citric acid could be eliminated. The nonionic surfactant provides a wetting agent as well as a dispersant for iron/rust residues. Finally, the perfume oil provides a pleasing fragrance when the product is used.

EXAMPLES

The following examples illustrate embodiments incorporating the present invention. It is to be understood that the examples presented below illustrate preferred embodiments of the present invention, but are not to be construed as limiting the scope of the invention. It is to be understood that the examples hereinbelow could be modified and yet remain within the scope and spirit of the present invention. For example, substitutes could be used for some components, ranges could be altered, and some components could be eliminated entirely. This application is intended to cover such departures from the present disclosure as come within known or customary practice in the art to which this invention pertains and which fall within the limits of the appended claims.

Example 1

Table 1 lists the compounds of the aqueous chemical solution as a percentage by weight of the total composition, in one embodiment of the present invention.

TABLE I

| | |
|---|---|
| Ammonium Bifluoride | 2.50% |
| Boric Acid | 2.50% |
| Oxalic Acid | 3.00% |
| Citric Acid | 3.00% |
| Nonionic Surfactant | 0.15% |
| Thickening Agent | 0.01% |
| Perfume Oil | 0.05% |
| Water | Balance |

The composition in Table I was evaluated for glass etching and rust removal from cotton material stained with ferric chloride solution.

Glass Etching Evaluation:

Microscope slides (glass) were thoroughly cleaned using a dish washing detergent, rinsed with clear water and dried with a paper towel. One end of the glass slide was marked to identify the product. The other end of the glass slide was immersed in a glass beaker containing 20 ml of the composition listed in Table I for a period of 10 minutes. The slide was removed and rinsed with clear water, dried with a paper towel, and then examined for evidence of etching. No evidence of etching was observed on the glass slide after 10 minutes immersion.

Rust Removal Evaluation:

A 3"×5" section of cotton "t-shirt" material was soaked overnight in a solution of ferric chloride, removed and allowed to air dry. After being soaked in the solution of ferric chloride, the cotton sample appeared dark orange in color. When dried, the composition listed in Table I was applied to the cloth (10 drops) and allowed to remain in contact with the surface of the stained material for 30 seconds. The material was rinsed with clear water and allowed to dry at room temperature. The cleaning effectiveness of the composition in Table I was acceptable in that the cloth material appeared light orange after the cleaning. No pungent orders were noticed from the Table I composition when compounded nor when it was used in the cleaning or etching evaluations. No deterioration of the cotton material was observed.

Example II

Table II lists the compounds of the aqueous chemical solution as a percentage by weight of the total composition, in one embodiment of the present invention.

TABLE II

| | |
|---|---|
| Ammonium Bifluoride | 3.0% wt. |
| Boric Acid | 3.5% wt. |
| Oxalic Acid | 3.5% wt. |
| Citric Acid | 2.75% wt. |
| Nonionic Surfactant | 0.175% wt. |
| Thickening Agent | 0.3% wt. |
| Perfume Oil | 0.0075% wt. |
| Water | Balance |

The composition listed in Table II was evaluated for rust removal and glass etching as described above with reference to Example I.

Results of Evaluation:

The cleaning effectiveness of the composition in Table II was marginal, in that the color change of the cloth after cleaning was not significant. No etching of glass slide was observed. No deterioration of the cotton material was observed.

Example III

Table III lists the compounds of the aqueous chemical solution as a percentage by weight of the total composition, in one embodiment of the present invention.

TABLE III

| | |
|---|---|
| Ammonium Bifluoride | 3.5% wt. |
| Boric Acid | 2.5% wt. |
| Oxalic Acid | 3.4% wt. |
| Citric Acid | 3.6% wt. |
| Nonionic Surfactant | 0.2% wt. |

TABLE III-continued

| | |
|---|---|
| Perfume Oil | 0.1% wt. |
| Thickening Agent | 0.35% |
| Water | Balance |

Results of Evaluation:

The cleaning effectiveness of the composition in Table III was evaluated similarly to that of examples I and II. After cleaning, the cotton cloth retained about half of the color of the untreated cloth. A slight glass etching (less than 10%) was observed. Theoretically, the glass etching was due to hydrofluoric acid present in the final composition. It is theorized that an excess of ammonium bifluoride was present in the initial ingredients, and the excess ammonium bifluoride reacted with the Oxalic acid to form hydrofluoric acid according to the following equation:

$$2F_2H_5N+H_3BO_3+H_2O \rightarrow BF_4H+F_2H_5N+HF$$

Example IV

Table IV lists the compounds of the aqueous chemical solution as a percentage by weight of the total composition, in a preferred embodiment of the present invention. The composition listed in Table IV was evaluated for rust removal and glass etching as described above with reference to Examples I, II and III. Additionally, the composition listed in Table IV was evaluated for rust stain removal effectiveness on the inside of a ceramic toilet supply tank, as described below.

TABLE IV

| | |
|---|---|
| Ammonium Bifluoride | 3.1% wt. |
| Boric Acid | 2.5% wt. |
| Oxalic Acid | 3.4% wt. |
| Citric Acid | 3.6% wt. |
| Nonionic Surfactant | 0.2% wt. |
| Perfume Oil | 0.1% wt. |
| Thickening Agent | 0.4% wt. |
| Water | Balance |

Results of Evaluation:

The cleaning effectiveness of the composition in Table IV was excellent. No iron stains remained on the cotton cloth after cleaning with the formula of Example IV. No etching of the glass slide was noticeable.

The formula of Example IV was also tested on severe rust stains present on the inside of two ceramic water supply tanks of two respective toilets. In both cases, the rust stains initially were a dark brown color entirely encompassing the perimeter of the tank to the level at which the water was maintained. In the first case, after cleaning with the composition of Example IV for a period of 30 seconds, most of the rust stains were dramatically lightened or removed, except for a stubborn stain portion around the perimeter of the tank at the water level mark. In the second case, after cleaning with the composition of Example IV for a period of approximately 2 minutes, most of the rust stains were dramatically lightened or removed, again with the exception of a stubborn stain portion around the perimeter of the tank at the water level mark. The inventive formula was only contacted with the stained ceramic surface for approximately 2 minutes which, except for the most stubborn rust stains, provides adequate cleaning action. It is estimated that even the stubborn stains would eventually lift if the inventive formula were allowed to remain in contact with the inside surfaces for a longer period of time.

Example V

Table V lists the compounds of the aqueous chemical solution as a percentage by weight of the total composition, in another preferred embodiment of the present invention.

TABLE V

| | |
|---|---|
| Ammonium Bifluoride | 3.1% |
| Boric Acid | 2.5% |
| Oxalic Acid | 3.4% |
| Thickening Agent | 0.4% |
| Surfactant | 0.2% |
| Perfume Oil | 0.1% |
| Deionized Water | Balance |

The composition in Table V was evaluated for glass etching and rust removal as described above with reference to Examples I, II and III.

Results of the Evaluation:

The cleaning effectiveness of the composition in Table V was excellent. No iron stains remained on the cotton cloth after cleaning. Further, it is expected that the composition of Example V would perform as effectively as the composition in Example IV on glazed and enamel surfaces having rust stains thereon.

While this invention has been described with reference to preferred examples, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A composition for removal of rust stains, said composition comprising:
   about 1 to 5 percent by weight of ammonium bifluoride;
   about 1 to 5 percent by weight of boric acid;
   about 1 to 5 percent by weight of oxalic acid; and
   fluoboric acid, said fluoboric acid formed by reaction of said ammonium bifluoride with said boric acid;
   the remainder of said composition being substantially water and, optionally, one or both of a surfactant and a thickening agent.

2. The composition of claim 1, further comprising about 1 to 5 percent by weight of citric acid.

3. The composition of claim 1, wherein said ammonium bifluoride comprises about 2.5 to 3.5 percent by weight, said boric acid comprises about 2 to 3 percent by weight and said oxalic acid comprises about 3 to 4 percent by weight.

4. The composition of claim 3, further comprising about 3 percent by weight of citric acid.

5. The composition of claim 4, wherein said surfactant comprises about 0.1 to 1.0 percent by weight and said thickening agent comprises about 0.1 to 0.5 percent by weight.

6. A composition for removal of rust stains, said composition consisting essentially of:
   about 1 to 5 percent by weight of ammonium bifluoride;
   about 1 to 5 percent by weight of boric acid;
   about 1 to 5 percent by weight of oxalic acid; and
   the remainder of said composition being substantially water and, optionally, one or both of a surfactant and a thickening agent;

whereby said ammonium bifluoride and said boric acid react in said composition to form fluoboric acid.

7. A method of treating rust stains comprising the following steps:
- (a) combining a predetermined amount of ammonium bifluoride with water in a container and dissolving the ammonium bifluoride;
- (b) after step (a), adding a predetermined amount of boric acid to the container;
- (c) mixing the contents of the container, whereby the boric acid and the ammonium bifluoride react to form a formula including fluoboric acid; and
- (d) applying the formula to an article having a rust stain thereon, said formula removing at least a portion of the rust stain.

8. The method of claim 7, wherein the predetermined amount of ammonium bifluoride is about 1 to 5 percent by weight of the formula and the predetermined amount of boric acid is about 1 to 5 percent by weight of the formula.

9. The method of claim 8, wherein the predetermined amount of ammonium bifluoride is about 2.5 to 3.5 percent by weight of the formula and the predetermined amount of boric acid is about 2 to 3 percent by weight of the formula.

10. The method of claim 9, further comprising adding predetermined amounts of oxalic acid and optionally, citric acid, after step (b).

11. The method of claim 7, further comprising adding predetermined amounts of oxalic acid and optionally, citric acid, after step (b).

12. The method of claim 7, further comprising adding an effective amount of thickener.

13. The method of claim 12, further comprising adding predetermined amounts of detergent and perfume after step (b).

14. The method of claim 8, further comprising heating and maintaining the container contents while mixing.

15. The method of claim 14, wherein the contents are heated and maintained at about 40 to 50 degrees Celsius.

16. The method of claim 7, further comprising adding water to bring the formula to a desired final weight.

17. A method of forming a rust stain removal formula comprising the following steps:
- (a) adding a thickener to a container having water therein;
- (b) adding a predetermined amount of ammonium bifluoride to the container;
- (c) after step (b), adding a predetermined amount of boric acid to the container, the boric acid reacting with the ammonium bifluoride to form fluoboric acid; and
- (d) after step (c), adding predetermined amounts of oxalic acid and optionally, citric acid.

18. The method of claim 17, wherein the predetermined amount of ammonium bifluoride comprises about 1 to 5 percent by weight of the formula.

19. The method of claim 18, wherein the predetermined amount of boric acid comprises about 1 to 5 percent by weight of the formula.

20. The method of claim 19, further comprising adding effective amounts of detergent and perfume.

21. The method of claim 19, wherein the predetermined amount of ammonium bifluoride is about 2.5 to 3.5 percent by weight of the formula and the predetermined amount of boric acid is about 2 to 3 percent by weight of the formula.

* * * * *